United States Patent [19]

Zwirn

[11] Patent Number: 4,713,694
[45] Date of Patent: Dec. 15, 1987

[54] NONINVASIVE DC RESTORATION TO UPGRADE AC COUPLED SYSTEMS

[75] Inventor: Robert Zwirn, Los Angeles, Calif.

[73] Assignee: Hughes Aircraft Company, Los Angeles, Calif.

[21] Appl. No.: 774,105

[22] Filed: Sep. 9, 1985

[51] Int. Cl.$^4$ .............................................. H04N 5/16
[52] U.S. Cl. .................................... 358/171; 358/166
[58] Field of Search ................ 358/171, 174, 160, 166

[56] References Cited

U.S. PATENT DOCUMENTS

| 4,214,271 | 7/1980 | Jones | 358/171 |
| 4,318,129 | 3/1982 | Zwirn | 358/174 |
| 4,400,729 | 8/1983 | Jones | 358/171 |
| 4,445,138 | 4/1984 | Zwirn | 358/160 |
| 4,575,760 | 3/1986 | Nakagaki | 358/167 |

Primary Examiner—Tommy P. Chin
Attorney, Agent, or Firm—Ronald L. Taylor; A. W. Karambelas

[57] ABSTRACT

A DC restoration circuit for a video imaging system having a detector array and AC coupled amplifiers is disclosed. The DC restoration circuit includes circuitry (15) for providing a difference signal indicative of the difference between a first scan line video signal and a second scan line video signal; a histogram circuit (20) responsive to the difference signal for generating histogram data indicative of the number of occurrences of difference values of the difference signal; a dominant shift detector circuit (30) responsive to the histogram data for determining a representative difference signal value and for providing a video correction signal which is based on the representative difference signal value; and correction circuitry (13, 17) responsive to the second scan line video signal and the video correction signal for providing a corrected video signal.

13 Claims, 9 Drawing Figures

NONINVASIVE DC RESTORATION TO UPGRADE AC COUPLED SYSTEMS

BACKGROUND OF THE INVENTION

The disclosed invention relates to video imaging systems, and is more particularly directed to a video signal processing circuit which provides for restoration of line-to-line variable DC shifts in the video signal of an AC coupled video imaging system.

AC coupled video imaging systems are utilized to provide video images of a scanned object scene. The scene being "looked at" is mechanically scanned (e.g., by a scan mirror) to provide optical radiation inputs to a plurality of detector elements, each of which is a channel that provides a detector output. The detector outputs are respectively AC coupled to amplifier stages which provide amplified video signals. The amplified video signals are utilized to produce a human observable display on an output transducer such as a CRT display or are further processed. As is well known, a video frame may include one or more fields where a plurality of fields are interlaced. On a video display, each video line of a field corresponds to the output of one detector element.

With AC coupling, each video line is independent of the other video lines and each video line is forced to have an average value of zero (i.e., no DC component). As a result, an object of uniform image brightness which spans several video lines (i.e., channels) may readily be represented differently on each video line, depending on the contents of the remaining portions of the video line. Stated another way, objects or portions of objects having non-uniform image brightness may be represented with the same intensity. The result is streaking which mars the appearance of the video image, may obscure target images, limits the usefulness of further video image processing, and reduces the probability of correct target decisions.

AC coupling removes from each video line the nonzero average (i.e., the presence of a DC component) which would have been present without the AC coupling for object scenes of interest. Of course, for an object scene of uniform brightness the average for each video line may very well be zero, but such an object scene would not be of interest and would be very unlikely. Also, AC coupling removes the line-to-line correlation that is present in images of interest.

Attempting to avoid streaking due to AC coupling by utilizing DC coupling presents its own problems, such as DC drift and the use of higher mechanical scan rates. Thus, the streaking due to AC coupling has been tolerated, and AC coupled video imaging systems are widely used.

Efforts have been made to reduce or remove streaks resulting from AC coupling, including the system set forth in U.S. Pat. No. 4,121,248, issued to C. R. Coale, Jr., on Oct. 17, 1978. The streak reduction system in U.S. Pat. No. 4,121,248 reduces streaks by calculating the statistics for a particular line and utilizing such statistics to provide a non-zero average of such particular line. The system disclosed therein is complex and ignores the line-to-line correlation which is present in images of interest.

Other known DC restoration techniques typically increase the complexity of the detector apparatus and the associated circuitry, and tend to be "invasive" by requiring the disassembly and modification of previously installed AC coupled video imaging systems. For example, with known invasive DC restoration techniques, precision optical reference radiation sources must be placed in the optical path at appropriate times during each scan and must uniformly illuminate all detectors. The responses of all the detectors to the reference radiation sources must be sensed and an appropriate DC shift must be respectively determined and applied for each channel. A further consideration is that invasive DC restoration apparatus is not readily, economically or practically retrofitted to existing installed AC coupled imaging systems.

SUMMARY OF THE INVENTION

It would therefore be an advantage to provide for AC coupled video imaging systems a DC restoration circuit.

It would also be an advantage to provide for AC coupled video imaging systems a DC restoration circuit which reduces streaking.

Another advantage would be to provide for AC coupled video imaging systems a DC restoration circuit which utilizes the correlation between adjacent video data lines.

A further advantage would be to provide for AC coupled video imaging systems a DC restoration circuit which utilizes the statistics of adjacent lines.

Yet another advantage would be to provide for AC coupled video imaging systems a DC restoration circuit which is readily added to previously installed AC coupled video imaging systems.

It would also be an advantage to provide for AC coupled video imaging systems a DC restoration circuit which determines a dominant DC shift between lines and eliminates such dominant shift between lines.

The foregoing and other advantages and features of the invention are provided in a DC restoration circuit which includes circuitry for providing a difference signal indicative of the difference between a first scan line video signal and a second scan line video signal; a histogram circuit responsive to the difference signal for generating histogram data indicative of the number of occurrences of different values of the difference signal; a dominant shift detector circuit responsive to the histogram data for determining a representative difference signal value and for providing a video correction signal which is based on the representative difference signal value; and correction circuitry responsive to the second scan line video signal and the video correction signal for providing a corrected video signal.

BRIEF DESCRIPTION OF THE DRAWING

The advantages and features of the disclosed invention will readily be appreciated by persons skilled in the art from the following detailed description when read in conjunction with the drawing wherein.

DETAILED DESCRIPTION OF THE DISCLOSURE

Figure 1:
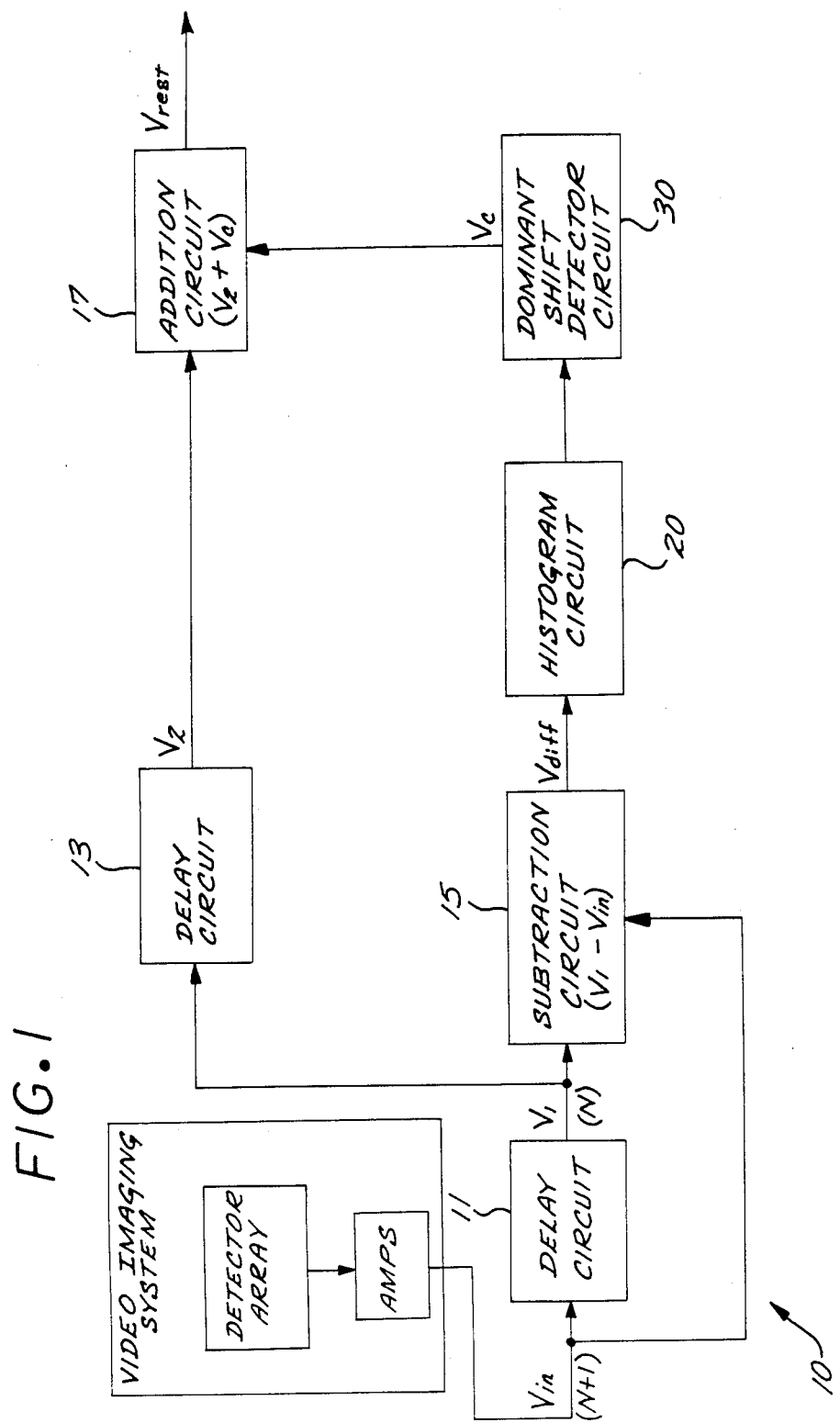
FIG. 1 is a block diagram of the DC restoration circuit of the invention.

In the following detailed description and in the several figures of the drawing, like elements are identified with like reference numerals.

Referring now to FIG. 1, shown therein is a block diagram of the non-invasive DC restoration circuit 10 of the invention. The DC restoration circuit 10 is non-invasive in the sense that its addition to a previously installed AC coupled video imaging system does not require substantial disassembly and/or modification of such installed system. The purpose of the DC restoration circuit 10 is to restore to each video line (except the first line) a non-zero average which had been removed by AC coupling. Such non-zero average corresponds to the average intensity of a video line and may be generally referred to as DC, DC term, or DC component.

The DC restoration circuit 10 includes a delay circuit 11 for accepting a video signal $V_{in}$ which may be provided by the video output amplifier of a video imaging system (not shown). By way of example, the video signal $V_{in}$ may be a serial digital signal wherein each digital value indicates the intensity of a particular pixel or may be an analog signal. The generation and clocking of digital video signals is well known in the art and will not be discussed with any particularity. Similarly, the generation and processing of analog video signals is also well known.

The delay circuit 11 provides as an output a first delayed video signal $V_1$ which is delayed by the time interval for one video scan line. The first delayed video signal $V_1$ is provided as an input to a further delay circuit 13 which provides as an output a second delayed video signal $V_2$. As discussed more fully herein, the delay circuit 13 provides sufficient delay to allow determination of an appropriate DC shift which is to be applied to the video signal being delayed to restore the DC component in such delayed video signal.

The DC restoration circuit 10 functions on a line by line basis, and the first delayed video signal $V_1$ may be considered line N while the video signal $V_{in}$ can be considered line N+1.

The first delayed video signal $V_1$ is also provided as an input to a subtraction circuit 15 which further accepts the video signal $V_{in}$ as another input. The subtraction circuit 15 subtracts the video signal $V_{in}$ from the first delayed video signal $V_1$ to provide a video difference signal $V_{diff}$. The video difference signal $V_{diff}$ includes information indicative of a possible DC shift between the line N and the line N+1. Such DC shift is the result of AC coupling and is manifested by an object of uniform intensity being displayed on two or more video scan lines with respectively different intensities.

The video difference signal $V_{diff}$ is provided to a histogram circuit 20 which determines and stores histogram data of the video difference signal $V_{diff}$ between the lines N and N+1. Particularly, the histogram circuit 20 maintains respective running totals of the number of occurrences of different values of the video difference signal $V_{diff}$.

The histogram data based on the difference between the respective video signals for two adjacent video scan lines is read, filtered, peak detected, and adjusted by a dominant shift detector circuit 30. As discussed more fully herein, the dominant shift detector circuit 30 processes the histogram data to determine a dominant DC shift between the line N and the line N+1. The negative of that dominant DC shift is then provided as a video correction signal $V_c$, which may be regarded as being the most representative value of the difference signal $V_{diff}$ between the lines N and N+1. Such video correction signal may also be considered as a DC shift signal which removes the dominant DC shift that is detected by the dominant DC shift detector circuit 30. As a result, a non-zero average or a DC component is restored to the line N+1.

The video correction signal $V_C$ from the dominant shift detector circuit 30 is provided as an input to an addition circuit 17. The addition circuit 17 further accepts as another input the second delayed video signal $V_2$ provided by the delay circuit 13, and provides as an output a relative DC restored video signal $V_{rest}$. As will be discussed more fully below, the DC restored video signal $V_{rest}$ for a given video scan line is restored relative to the video signal for the immediately preceding video scan line of the current field, except for the first video scan line in a field. The relative DC restored video signal $V_{rest}$ is available for further appropriate processing prior to display by an appropriate output transducer such as a CRT display.

The delay provided by the delay circuit 13 is chosen so that the second delayed video signal $V_2$ for the line N+1 does not appear at its output until the video correction signal $V_C$ based on the lines N and N+1 has been determined and is available at the output of the dominant shift detector circuit 30. Thus, the video correction signal $V_C$ based on the lines N and N+1 is added to the video signal for the line N+1, and, therefore, the relative DC restored video signal $V_{rest}$ is the DC restored video signal for the line N+1 and includes a restored DC component relative to the video signal for the line N. The video scan line N may, therefore, be considered the prior line and the video scan line N+1 may be considered the present or current line.

It should be readily apparent that correction of a particular video line depends on the information contained in the difference between such particular video line and the immediately preceding video line. It should also be apparent that for the first or top video scan line of a field, there is no prior video scan line. Thus, the video correction signal $V_C$ is set to zero for the first video scan line of a field.

After the video signals for a field have been provided with relative restored DC components (i.e., non-zero averages), further processing may be utilized, for example to shift all video signals for the lines in a field to reduce the effects of the video signal for the first line which was not DC restored. Examples of further processing of video signals are set forth in U.S. Pat. No. 4,318,129, issued to R. Zwirn on Mar. 2, 1982, and assigned to the assignee of the subject invention; and in U.S. Pat. No. 4,445,138, issued to R. Zwirn, et al., on Apr. 24, 1984, and assigned to the assignee of the subject invention.

Figure 2:
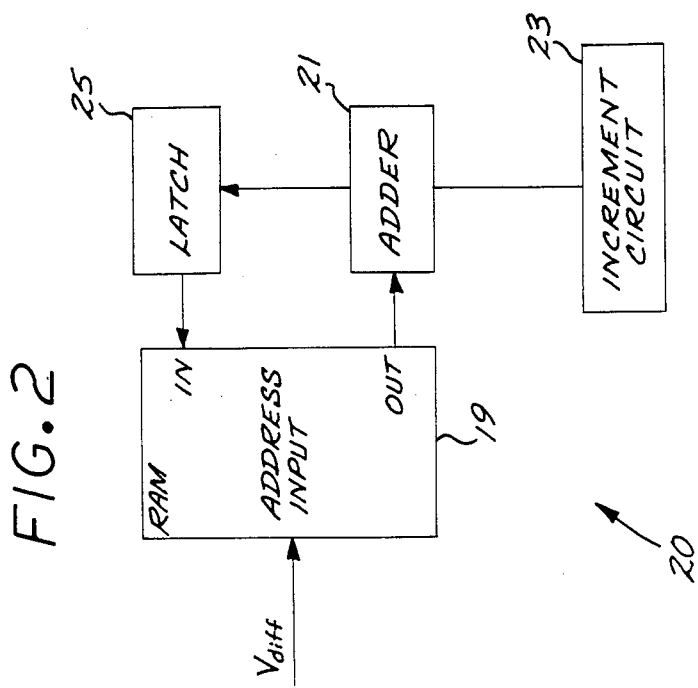
FIG. 2 is a block diagram of the histogram circuit of the DC restoration circuit of FIG. 1.

Referring now to FIG. 2, shown therein by way of example is block diagram of the histogram circuit 20 which utilizes digital values of the video difference signal $V_{diff}$. Such digital signals may be provided by having a digital video signal $V_{in}$ so that the subtraction circuit 15 provides a pixel-by-pixel sequence of values of the video difference signal $V_{diff}$. The difference signal values are provided to the address input of a random access memory (RAM) 19. Each time a difference signal $V_{diff}$ value is provided at the address input of the RAM 19, the contents of the memory location corresponding to that particular address is read into an adder 21. The contents of the adder 21 is then incremented by one by an increment circuit 23. The incremented result is buffered in a latch circuit 25 and written back into the RAM 19 at the same address from which it had been read out prior to incrementing.

Thus, the histogram is based on respective memory addresses which correspond to particular values of the video difference signal $V_{diff}$. The number of occurrences of a particular value of the video difference signal $V_{diff}$ is represented by the contents of the memory location corresponding to the particular value.

By way of example, a range of addresses from 0 through 255 may be utilized for use with a range of difference signal values from −128 through 127. With such range of addresses, the values of the video difference signal $V_{diff}$ would be increased by 128 to correspond to the range of addresses. In subsequent processing, the address corresponding to a particular value of the video difference signal $V_{diff}$ would be reduced by 128 to obtain the actual video difference signal value.

For ease of reference, histogram data shall be considered as respective ordered pairs which may be represented as (A,B), where A is a particular value of the difference signal $V_{diff}$ and B is the histogram value identifying the number of occurrences of that difference signal value. Thus, the histogram data may be graphically represented with two dimensional Cartesian coordinates where the horizontal axis represents the values of the difference signal $V_{diff}$ and the vertical axis represents the histogram values. A simplified example of histogram data is set forth in FIG. 6 which is discussed further below.

By way of example, the dominant shift circuit 30 may be implemented with a microprocessor, an associated random access memory, address and data buses, and programs for providing the necessary functions. The histogram data based on the difference between the video signals for two adjacent scan lines stored in the RAM 19 of the histogram circuit 20 would be accessed and stored in the random access memory for the microprocessor, so that the histogram circuit 20 would be available to determine the next histogram data while the present histogram data can be processed by the dominant shift detector circuit 30.

Figure 3:
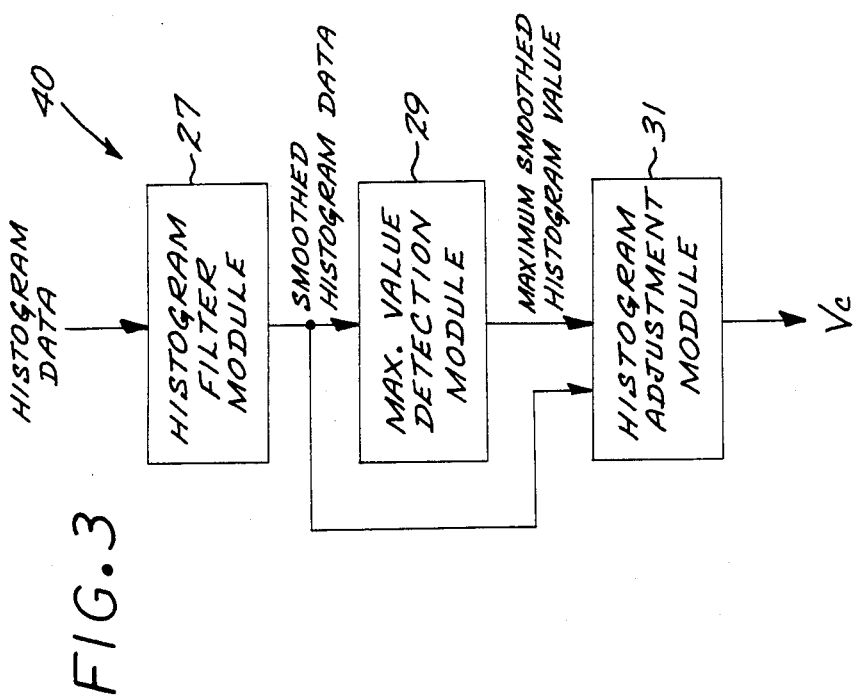
FIG. 3 is a block diagram of the dominant shift detector circuit of the DC restoration circuit of FIG. 1.

Referring now to FIG. 3, shown therein is a block diagram of the program function modules 40 for the dominant shift detector circuit 30, which may be implemented with appropriate microprocessor programs. A histogram filter module 27 smooths the histogram data from the histogram circuit 20 to provide a smoothed histogram. The smoothed histogram is processed by a maximum value detection module 29 which determines the maximum smoothed histogram value and the associated video difference signal value.

The maximum smoothed histogram value and the associated video difference signal value so provided are processed in conjunction with the smoothed histogram by a histogram adjustment module 31 which determines an adjusted video difference signal value as being the most representative value of the video difference signal $V_{diff}$. Such adjusted video difference signal value is based on the shape or distribution of the smoothed histogram in the vicinity of the maximum smoothed histogram value determined by the maximum value detection module 29.

By way of example, the filter module 27 may provide smoothed histogram data wherein each smoothed histogram value (number of occurrences) is the sum of the corresponding non-smoothed histogram value and the two non-smoothed histogram values on either side. Thus, each smoothed histogram value is the sum of the five adjacent non-smoothed histogram values. With such a filtering process, the smoothed histogram data will have four values less than the non-smoothed histogram data since the first two values and the last two values of the non-smoothed histogram data do not have corresponding smoothed data.

The maximum detection module 29 may be a simple peak sort routine which determines the maximum smoothed histogram value and its corresponding video difference signal value. The maximum smoothed histogram value and its corresponding video difference signal are provided to the histogram adjustment module 31.

As mentioned above, the histogram adjustment module 31 adjusts the value of what is regarded as the most representative value of the video difference signal $V_{diff}$ on the basis of the shape or distribution of the histogram data in the vicinity of the maximum smoothed histogram value. That is, a value of the voltage difference signal $V_{diff}$ other than the value corresponding to the maximum smoothed histogram value may be determined as being the most representative value of the voltage difference signal.

By way of example, the slope on either side of the smoothed maximum histogram value may be roughly determined by utilizing two smoothed histogram values on either side of the maximum smoothed histogram value. If the slopes are somewhat symmetrical, then the value of the video difference signal $V_{diff}$ regarded as being most representative corresponds to the value associated with the maximum smoothed histogram value. If one slope is steeper, then the value of the video difference signal $V_{diff}$ regarded as being most representative is adjusted toward the side having the more shallow slope. The adjusted value of the video difference signal $V_{diff}$ regarded as being most representative is provided as the video correction signal $V_C$.

For example, if the slope is steeper in the decreasing direction of the video difference signal, then the value of the video difference signal $V_{diff}$ regarded as being most representative is increased relative to the video difference signal value associated with the maximum smoothed histogram value, which provides a more representative value of the video difference signal $V_{diff}$. That is, the adjusted video difference signal value provided as the video correction signal $V_C$ is more representative than the video difference signal value that corresponds to the maximum smoothed histogram value.

The Appendix sets forth simplified examples of routines for implementing the program function modules 40. It should be noted that implementation of the histogram adjustment module 31 may include a look-up table, whereby the slope information discussed above is utilized to address a look-up table for determining the most representative value of the difference signal $V_{diff}$. The look-up table would be based on representative slope information. The use of a look-up table may be advantageous in applications where faster processing is required.

In the foregoing DC restoration circuit 10 the values of the video difference signal $V_{diff}$ are actually indicative of the negative of a possible DC shift of the line N+1 relative to the line N. This follows from the subtraction of the video signal for the line N from the video signal for the line N+1. Therefore, the dominant shift detector circuit 30 actually determines the negative of a dominant DC shift of the line N+1 relative to the line N. Such negative dominant DC shift is equal to the DC shift that should be added to the video signal for the line N+1 to remove the corresponding dominant DC shift. Thus, the negative dominant DC shift determined by the dominant shift detector circuit 30 is added as the video correction signal $V_C$ to the video signal for the line N+1 by the addition circuit 17.

It should be readily understood that a "dominant" DC shift between two video scan lines may be determined by different techniques which may very well provide different values. Such different values are appropriate so long as they somehow represent a dominant or representative DC shift between lines.

In the foregoing DC restoration circuit 10, each DC restored line is advantageously utilized to determine the DC shift required by the subsequent line. This can be accomplished by one of several techniques. For example, the DC shift determined for the line N (where N is greater than or equal to 2) may be added to the DC restored video signal $V_{rest}$ for the line N+1. Alternatively, the DC restored video signal $V_{rest}$ for the line N may be utilized by the subtraction circuit 15.

Figure 4:
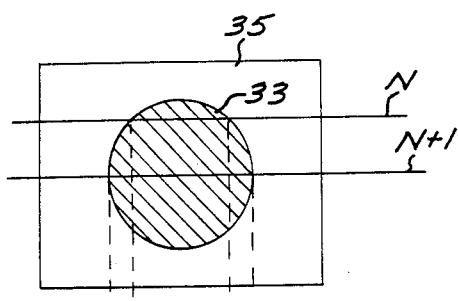
FIG. 4 is an illustration of a simplified object scene which is utilized to illustrate the operation of the DC restoration circuit of FIG. 1.

In order to more fully understand the above described DC restoration circuit, a simplified example will be discussed with reference to FIG. 4, FIGS. 5A through 5D and FIG. 6. FIG. 4 illustrates an object scene having a disk 33 of uniform brightness against a background 35 of uniform brightness and which is darker than the disk 33. The line segments N and N+1 schematically represent the optical scan provided by two adjacent detector elements which result in the video signal for the video scan lines N and N+1.

Figure 5A:
FIGS. 5A through 5D schematically illustrates certain video signal waveforms for the object scene of FIG. 4.

FIG. 5A represents the AC coupled video signal for the video scan line N which is based on the optical scan N shown in FIG. 4. Particularly, the video signal for the line N includes, by way of example, 2.0 volts for the uniform disk 33 and −1.0 volts for the uniform background 35. These values result from the AC coupling which forces the video signal for the line N to have a zero average.

Figure 5B:
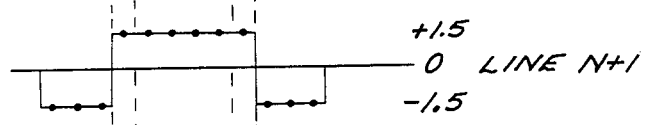

FIG. 5B represents the AC coupled video signal for the video scan line N+1 which is based on the optical scan N+1 shown in FIG. 4. Particularly, the video signal for the line N+1 includes 1.5 volts for the line N and −1.5 volts for the line N+1. These values also result from the AC coupling which forces the video signal for the line N to have a zero average.

It should be readily understood that the scan lines in FIG. 4 and the video signals in FIGS. 5A and 5B are schematically shown for ease of illustration. Comparison of the AC coupled video signals in FIGS. 5A and 5B shows that the AC coupled video signals for the lines N and N+1 are not of comparable level for the disk 33. Similarly, the AC coupled video signals for the lines N and N+1 are not of comparable level for the background 35. The display resulting from such AC coupled signals would be streaked, whereby the video image of the disk 33 would not be of uniform intensity and the video image of the background 35 would also not be of uniform intensity.

Figure 5C:
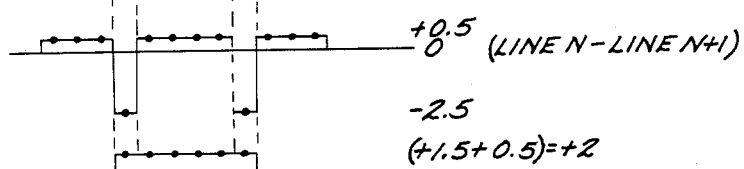

FIG. 5C is a plot of the pixel-by-pixel differences between the respective video signals for the line N and the line N+1. Such differences correspond to the video difference signal $V_{diff}$ provided by the subtraction circuit 15 of the DC restoration circuit 10 of FIG. 1.

Figure 6:
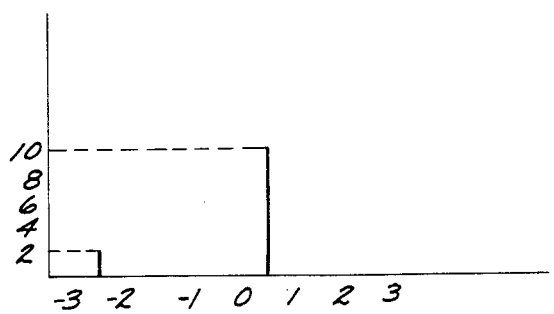
FIG. 6 is a histogram for explaining the operation of the DC restoration circuit of FIG. 1 with the simplified object scene of FIG. 4.

FIG. 6 is a histogram of the differences between the video signals for the line N and the line N+1. The histogram data shown in FIG. 6 correspond to the histogram data that is determined and stored by the histogram circuit 20 (FIGS. 1 and 2). The maximum value of the histogram is 10 which has a corresponding video difference signal value of 0.5. Since the histogram data about the maximum value of 10 is somewhat uniform, the corresponding video difference signal value of 0.5 is taken as being most representative.

Figure 5D:
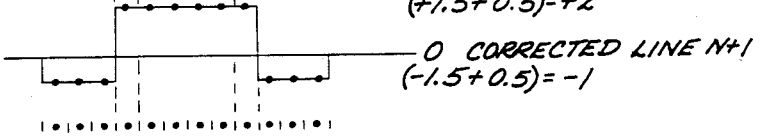

Adding the constant 0.5 to video signal for the line N+1 results in the DC restored video signal of FIG. 5D for the line N+1. The DC restored video signal includes 2.0 volts for the uniform disk 33 and −1.0 volts for the uniform background 35.

Comparison of FIG. 5D with FIG. 5A shows that the video signal values for the line N and the DC restored video signal values for the line N+1 are of comparable level for the disk 33, and are also of comparable level for the background 35. Thus, the display resulting from the video signals of FIGS. 5A and 5D would show the disk 33 with uniform intensity and would show the background 35 with uniform intensity.

While the foregoing described DC restoration circuit has been described in the general context of video imaging to which it is applicable, it should be readily understood that the disclosed non-invasive DC restoration circuit may be particularly advantageous in video imaging systems which operate in non-visible spectral regions. For example, the disclosed non-invasive DC restoration circuit may be advantageously utilized with forward looking infrared (FLIR) detector systems wherein the video image brightness indicates thermal radiation.

Although the foregoing has been a description and illustration of specific embodiments of the invention, various modifications and changes thereto can be made by persons skilled in the art without departing from the scope and spirit of the invention as defined by the following claims.

| APPENDIX | |
|---|---|
| 10 REM | HISTOGRAM FILTER |
| 20 REM | N = ADDRESS OF A VIDEO DIFFERENCE SIGNAL VALUE |
| 25 REM | NMAX = MAXIMUM NUMBER OF ADDRESSES (FOR NMAX = 256 THE ADDRESSES RUN FROM 0 TO 255 AND CORRESPOND TO PIXEL DIFFERENCES IN THE RANGE −128 to 127) |
| 30 REM | D(N) = NUMBER OF OCCURRENCES OF THE VIDEO DIFFERENCE SIGNAL VALUE CORRESPONDING TO N |
| 40 REM | F = FILTER LENGTH (THE NUMBER OF VIDEO DIFFERENCE SIGNAL VALUES WHICH ARE COMBINED TO PROVIDE A SMOOTHED OUTPUT) |
| 50 REM | F(N) = OUTPUT OF THE FILTER FOR VIDEO DIFFERENCE SIGNAL VALUE CORRESPONDING TO N |
| 70 | F = 5: NMAX = 256: F(0) = 0 |
| 80 | DIM D(260): DIM F(260) |
| 90 | FOR N = 1 TO F |

```
                              -continued
                               APPENDIX
100       F(N) = F(N−1) + D(N)
110       NEXT N
120       F(F/2) = F(F)
130       FOR N = (F/2) +1 TO NMAX−(F/2)
140       F(N) = F(N−1) + D(N + (F/2)) − D(N − (F/2))
150       NEXT N
160 REM   OUTPUTS ARE VALID FROM F/2 TO
          (NMAX − F/2)
170 REM   MAXIMUM HISTOGRAM VALUE DETECTION
180 REM   FMAX = MAXIMUM TO BE FOUND
190 REM   NPEAK = ADDRESS OF MAXIMUM
200       FMAX = 0: NPEAK = 0
210       FOR N = F/2 TO NMAX − (F/2)
220       IF F(N) > FMAX THEN FMAX = F(N):
          NPEAK = N
230       NEXT N
240 REM   HISTOGRAM ADJUSTMENT
250 REM   W = WINDOW CENTERED ON THE MAXIMUM
260 REM   CENT = ADDRESS CORRESPONDING TO
          THE DOMINANT OFFSET
270 REM   VCOR = VIDEO CORRECTION SIGNAL
280       W = 20: NUM = 0: DENOM = 0
290       FOR N = (NPEAK − W/2) TO (NPEAK + W/2)
300       NUM = NUM + N * F(N): DENOM =
          DENOM + F(N)
310       NEXT N
320       CENT = NUM/DENOM
330       VCOR = CENT − 128
```

What is claimed is:

1. For an AC coupled video imaging system such as one having a detector array and AC coupled amplifiers for providing a single serial input video signal representing a plurality of video lines, a video correction circuit comprising:

means responsive to the video signal for providing a difference video signal indicative of the running difference video between two versions of the video signal spaced one line apart, for all pairs of lines histogram means responsive to said difference video signal for generating histogram data indicative of the number of occurences of different values of said difference video signal;

detector means responsive to said histogram data for determining a dominant DC shift between ongoing consecutive video lines of the input video signal, and for providing a video correction signal based on said dominant DC shift; and correction means responsive to video signal of the second of the consecutive video lines and said video correction signal for providing a corrected video signal.

2. The video correction circuit of claim 1 wherein said means for providing said difference video signal comprises:

first delay means responsive to the input video signal for providing a delayed version of the input video signal called the first video line which is delayed by one video line and synchronized with the input video signal called the second video line and means for subtracting the video signal for the second video line from said delayed version of the video signal for the first video line to provide said difference video signal.

3. The video correction circuit of claim 2 wherein said correction means comprises:

second delay means responsive to the output of said first delay means for providing a further delayed version of the video signal of the second video line and means for adding said correction signal and said further delayed version of the video signal of the second video line to provide said corrected video signal.

4. The video correction circuit of claim 1 wherein said detector means comprises:

means for filtering said histogram data to provide smoothed histogram data including a maximum smoothed histogram value;

means for detecting the maximum smoothed histogram value; and adjustment means responsive to said smoothed histogram data and said maximum smoothed histogram value for determining a value of said difference video signal that is representative of said dominant DC shift, and for providing said representative value of said difference video signal as said correction signal.

5. The video correction circuit of claim 4 wherein said adjustment means determines said representative value of said difference video signal on the basis of the distribution of said smoothed histogram data in the vicinity of said maximum smoothed histogram value.

6. For an AC coupled video imaging system such as one having a detector array and AC coupled amplifiers for providing a single serial input video signal representing a plurality of video lines, a video correction circuit comprising:

means responsive to the video signal for providing a difference video signal indicative of the difference between the video signal of a first video line and the video signal of a second video line for all pairs of lines;

means responsive to said difference video signal for determining a dominant DC shift between said video signal of a first video line and said video signal of a second video line, and further for providing a video correction signal based on said dominant DC shift; and correction means responsive to the video signal of a second video line and said video correction signal for providing a corrected video signal.

7. The video correction circuit of claim 6 wherein said means for determining a dominant DC shift comprises:

histogram means responsive to said difference video signal for generating histogram data indicative of the number of occurrences of different values of said difference video signal; and detector means responsive to said histogram data for determining said dominant DC shift, and for providing said video correction signal.

8. The video correction circuit of claim 7 wherein said detector means comprises:

means for filtering said histogram data to provide smoothed histogram data including a maximum smoothed histogram value;

means for detecting the maximum smoothed histogram value; and adjustment means responsive to said smoothed histogram data and said maximum smoothed histogram value for determining a value of said difference video signal that is representative of said dominant DC shift between said video signal of a first video line and said video signal of a second video line, and for providing said reprentative value of said difference video signal as said correction signal.

9. The video correction circuit of claim 8 wherein said adjustment means determines said representative value of said difference video signal on the basis of the distribution of said smoothed histogram data in the vicinity of said maximum smoothed histogram value.

10. For an AC coupled video imaging system such as one having a detector array and AC coupled amplifiers for providing a single serial input video signal representing a plurality of video lines, a video correction circuit comprising:

means responsive to the video signal for providing a difference video signal indicative of the difference video between the video signals for two consecutive video lines for all pairs of video lines; and means responsive to said difference video signal for removing a dominant DC shift between the video signals for said consecutive video lines to provide for DC restoration of the video signal for each of the second of said consecutive video lines.

11. A method for restoring DC to a video signal comprising the steps of:

providing a difference video signal indicative of the difference between the video signals for two consecutive video lines; and determining on the basis of the difference video signal a dominant DC shift between the video signals for the two consecutive video lines; and providing to the video signal for the second of the two consecutive video lines a correction signal based on the dominant DC shift to provide for a DC restored video signal for such second one of the two consecutive video lines.

12. The method of Claim 11 wherein the step of determining a dominant DC shift includes the steps of:

providing a histogram of the difference video signal where the histogram identifies the number of occurrences of different values of the difference video signal;

filtering the histogram to provide a smoothed histogram including a maximum smoothed histogram value; and determining from the smoothed histogram a representative value of the difference video signal that is representative of the dominant DC shift.

13. The method of claim 12 wherein said step of determining a representative value of the difference video signal includes the steps of:

determining the maximum smoothed histogram value of the smoothed histogram and the corresponding difference video signal value; and providing a representative value of the difference video signal on the basis of histogram values in the vicinity of the maximum smoothed histogram value.

* * * * *